June 23, 1936.     H. F. SMITH     2,045,000
REFRIGERATING APPARATUS
Original Filed July 30, 1931    2 Sheets-Sheet 1
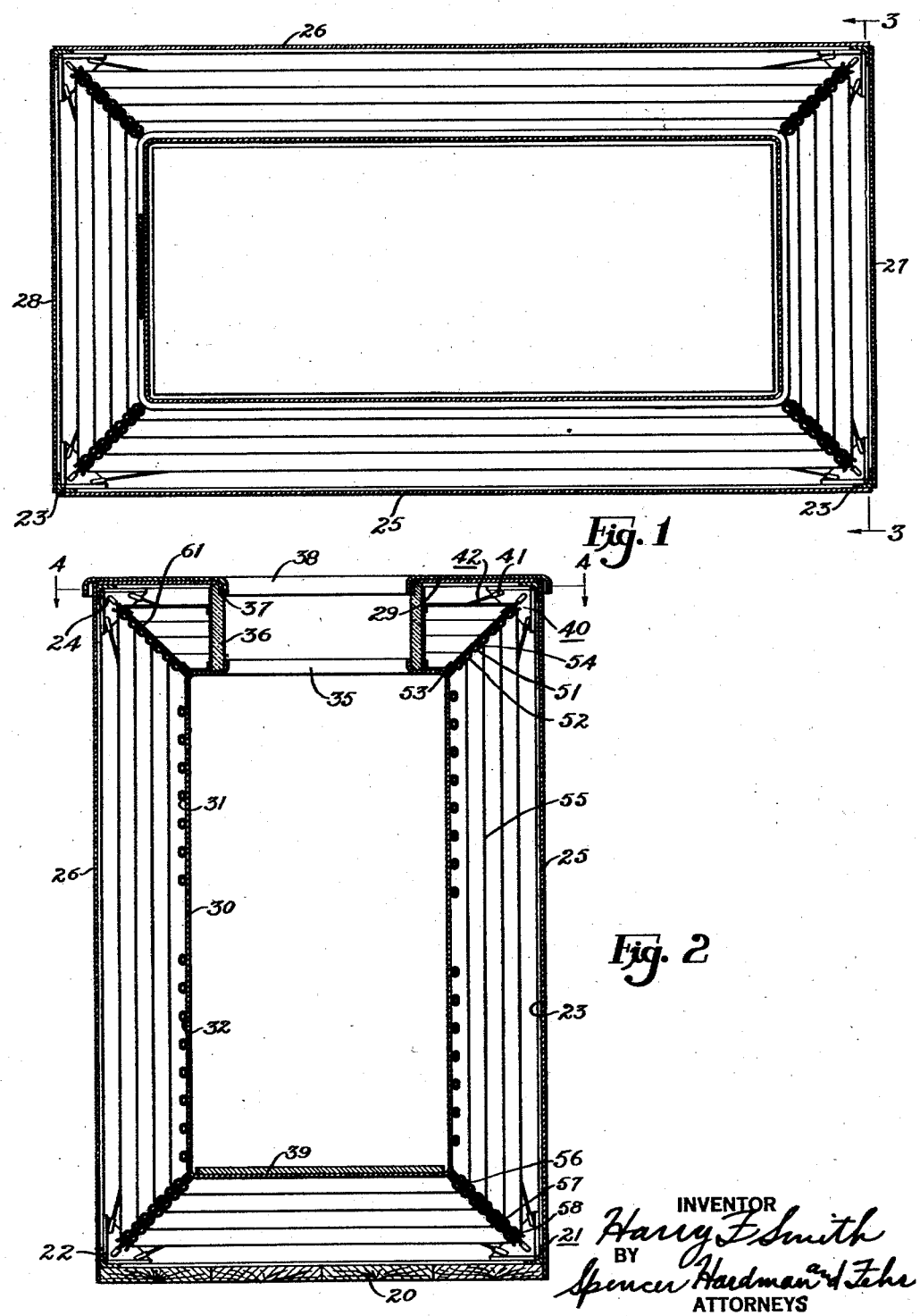
INVENTOR
Harry F. Smith
BY
Spencer Hardman & Fehr
ATTORNEYS June 23, 1936.  H. F. SMITH  2,045,000
REFRIGERATING APPARATUS
Original Filed July 30, 1931   2 Sheets-Sheet 2
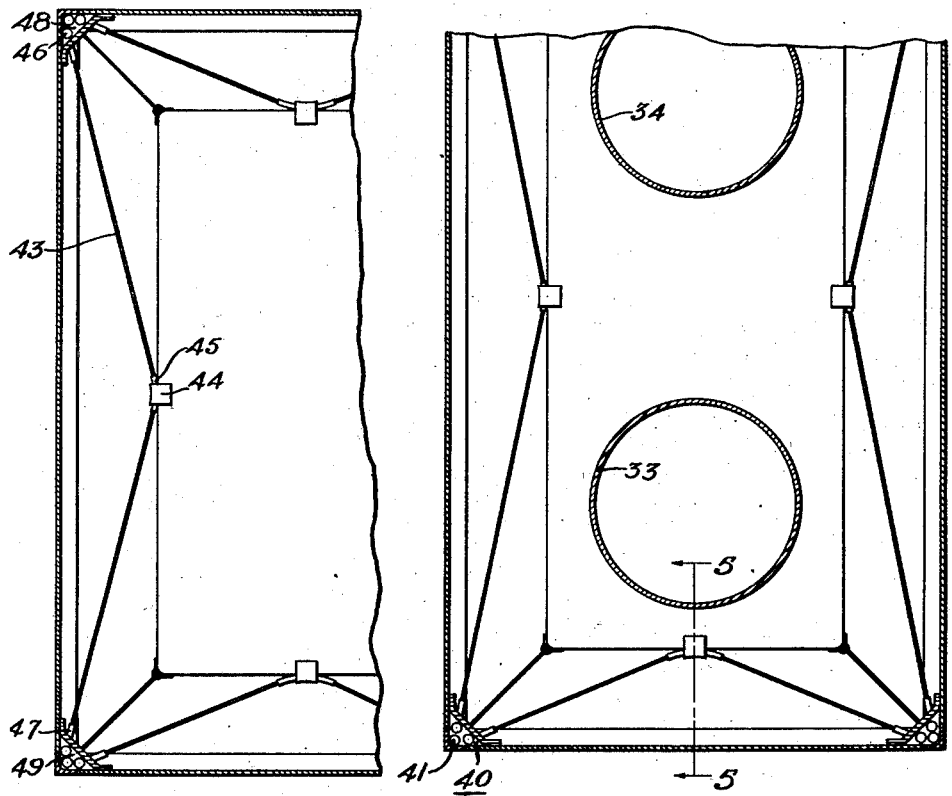
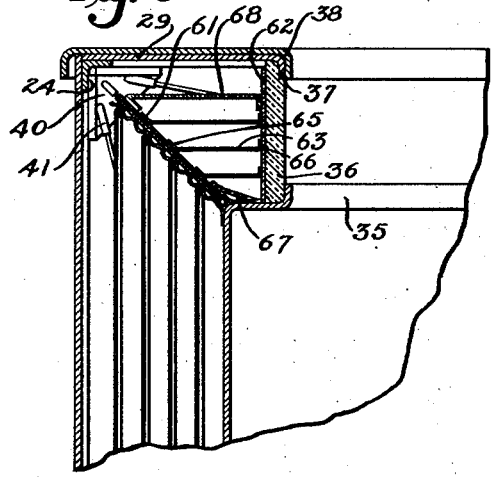
INVENTOR
Harry F. Smith
BY
Spencer Hardman&Fehr
ATTORNEYS Patented June 23, 1936

2,045,000

UNITED STATES PATENT OFFICE 2,045,000

REFRIGERATING APPARATUS

Harry F. Smith, Dayton, Ohio, assignor, by mesne assignments, to General Motors Corporation, a corporation of Delaware Application July 30, 1931, Serial No. 554,061
Renewed December 12, 1933

14 Claims.  (Cl. 220—9)

This invention relates to refrigerating apparatus and more particularly to heat insulated cabinet construction.

In the manufacture of insulated cabinets, it has been proposed to use air spaces in the walls thereof to prevent the transfer of heat therethrough. Heretofore such practice has been unsatisfactory for the reason that radiant heat will pass freely through air, and, in addition, the convection currents set up therein will transfer large amounts of heat therethrough. To overcome the transfer of radiant heat it has been proposed to provide a dead air space bounded by a thin bright metal foil or leaf, such for instance as bright aluminum foil. By the term "metal foil" is meant thin leaves of metal either with or without paper backing of such thickness that they can be readily formed to any desired shape. It has been found that these bright metallic surfaces of foil radiate but very little heat, and consequently it is possible to utilize air spaces lined with such bright surfaces in heat insulating cabinets. By making the air spaces smaller by providing more air spaces, and by reducing the radiation loss, the convection currents are minimized.

Attempts to adapt such thin bright metallic foil to cabinet construction so as to utilize air spaces in the walls thereof for insulating purposes have met with great difficulty. In the first place, this foil is extremely thin and consequently must be constructed in such a manner as to prevent rupturing of the foil during the assembly of the cabinet and after the cabinet is in service. In addition, the foil must be so supported within the cabinet walls so as to maintain it substantially taut throughout the life of the cabinet, while at the same time preventing the transfer of heat through these supporting means. Thirdly, in using foil insulation, a different type of construction is usually necessary. In many types of insulation the insulation itself can be used to support portions of the cabinet since it has some compressive strength. When foil insulation is used, such methods of support cannot be used and other types of supports are necessary.

It is to such structure that my invention particularly relates having for one of its objects to provide an improved cabinet construction having foil insulation, that is a cabinet capable of utilizing a thin bright metallic foil to advantage while at the same time eliminating most of its disadvantages.

More particularly, it is an object of the invention to provide an improved cabinet construction having an improved type of foil insulation in the form of independent panels and having an improved type of structural members especially adapted, though not necessarily, for use with the improved type of foil insulation.

Further objects and advantages of the present invention will be apparent from the following description, reference being had to the accompanying drawings, wherein a preferred form of the present invention is clearly shown.

In the drawings:

Fig. 1 is a horizontal sectional view through an ice cream cabinet disclosing one form of the invention;

Fig. 2 is a vertical sectional view through the ice cream cabinet;

Fig. 3 is a sectional view along the lines 3—3 of Fig. 1 with the insulation removed.

Fig. 4 is a sectional view along the lines 4—4 of Fig. 2 with the insulation removed, and Fig. 5 is a sectional view along the lines 5—5 of Fig. 4 but including the insulation.

In order to illustrate my invention, I have shown in the drawings an ice cream cabinet. Referring more particularly to Fig. 2 there is provided a base 20 to which is fastened an angle iron outer framework 21 which supports the outer walls of the cabinet. The angle iron members 22 of the framework 21 extend along the edges of the base 20 and their ends are connected to upright angle members 23. To the upper ends of these upright angle members 23 are attached the upper cross members 24 which support the top of the cabinet. The side walls 25, 26, 27, and 28 are supported by, and attached to, the angle iron framework 21. These side walls may be attached to the framework by bolts, rivets, welding, or other suitable means so that the framework becomes an integral part of the walls. Similarly, the top wall 29 is supported by and attached to the upper cross members 24.

Within the interior of the cabinet there is provided a food storage compartment 30 which, in the present case, may be used for storing ice cream or similar foods. If desired, this food storage compartment may be provided with a brine type of cooling, but preferably, in order to reduce the weight of the cabinet, and particularly the weight of the food storage compartment, it is desirable to apply the refrigerant directly to the walls of the food storage compartment. Accordingly, in Fig. 2 this type of refrigeration is illustrated, and refrigerant conduits in the two sections 31 and 32 surround the food storage compartment and are in thermal contact therewith for applying the refrigeration to the food storage compartment.

The bottom of the food storage compartment is reinforced by a heavy metal plate 39. Hand holes 33 and 34 are provided in the upper walls of the cabinet for access to the food storage compartment. The upper wall of the food storage compartment 30 is provided with an upwardly turned flange 35 about which an insulating collar 36 is seated for providing a wall about each of the hand holes 33 and 34. The top wall of the cabinet is provided with a downwardly turned flange 37, which holds the upper portion of the insulating collar 36 in place. The insulating collar 36 provides a wall around the hand holes and yet prevents the conduction of heat between the outer walls and the walls of the food storage compartment. The top wall 29 of the cabinet is provided with a bright metallic covering 38, preferably of monel or stainless steel.

A novel means for supporting the food storage compartment is provided. Formerly, in such cabinets it was quite customary to support the food storage compartment upon the insulation. In the present instance, such construction is impossible and consequently I have devised a means for supporting the food storage compartment from the outer walls of the cabinet. In supporting the food storage compartment from the outer walls of the cabinet, it is necessary to so design the connecting means that little heat is conducted from the outer walls of the cabinet to the food storage compartment. In order to provide a construction having these qualities, I have provided a plurality of triangular brackets or anchor plates, generally designated as 40, which are fastened to each of the inner corners of the outer walls by welding or other suitable means. Each of these brackets 40 are provided with three holes into which turnbuckles 41 are inserted. These turnbuckles are each threaded on to the end of guy wires, such as for example to the guy wire 42, which guy wires connect to portions of the walls of the food storage compartment. Taking the guy wire 43 shown in Fig. 3 for an example, the method of fastening the guy wires to the food storage compartment will be described. In this type of construction, a strip of metal 44 is taken and provided with a loop to receive a sleeve 45 and then the ends of the strip are fastened preferably at the center of one of the edges of the food storage compartment by welding or other suitable means. The guy wire 43 in this case is threaded through this sleeve 45 and has its ends threaded into the turnbuckles 46 and 47 which are held within apertures within the brackets 48 and 49 in the inner corners of the outer walls of the cabinet. The upper ends of the turnbuckles preferably have a spherical contour to provide a ball and socket joint. By stretching the guy wires over the corners of the outer walls of the cabinet to a point in the middle of the edges of the food storage compartment, a comparatively long path for the heat to travel is provided. Since these guy wires are of a very small diameter and of a metal having a relatively low value of heat conductivity, the loss of heat through this method of supporting construction is relatively small. This type of supporting construction also lends itself very well to my improved type of foil insulation.

A similar supporting construction is provided throughout the cabinet. The triangular brackets, as mentioned before, are provided in each of the inner corners of the outer walls, and attaching angle-shaped strips, similar to the attaching strip 44, are fastened to the center portions of each of the edges of the food storage compartment. Each of these attaching strips is provided with loops, similar to that provided for the strip 44, for receiving a sleeve. Guy wires are stretched from the triangular brackets through the sleeves, held by adjacent attaching strips, to other triangular brackets. The connections between the guy wires and the triangular brackets are preferably made by turnbuckles threaded onto the guy wires. At this point it should be observed that all of the guy wires extend in planes determined by adjacent edges of the inner and outer walls and these planes are positioned at an angle of 45° to the sides of the food storage compartment.

In my improved type of foil insulation a rectangular frame member of a peculiar type is provided for supporting the sheets of foil in spaced relation. Preferably, there is one frame member for each wall of the cabinet but this may vary according to the size, shape, and construction of the cabinet.

As shown at the side of Fig. 2, this rectangular frame member is preferably constructed of corrugated cardboard having smooth outer surfaces which extend at an angle of 45°, preferably, to the plane of the rectangle. The inner surfaces of the rectangular frame member 51 are formed of the corrugated strip of cardboard 52 which is fastened to a plain strip of cardboard 53 which forms the outer side of the rectangular member. The corrugated strip of cardboard 52 has its corrugations extending around the rectangle so as to form a plurality of steps extending entirely around the interior of the rectangle to which the edges of the sheets of bright metallic foil may be attached. The steps will, of course, have perimeters of different lengths. The outer strip of cardboard 53 and the inner corrugated strip of cardboard 52 are, of course, attached together by a suitable glue or paste.

There are several methods of attaching the sheets of bright metallic foil to these rectangular frame members. One of the methods is shown in Figs. 1, 2, and 5. In this method, a rectangular wire sub-frame 54 is provided which just fits into one of the corrugations or steps extending around the inner surface of the rectangular member. These sub-frames are preferably similar and the sub-frame 54 is merely taken as an example. A sheet of bright metallic foil 55 is attached to such a rectangular wire sub-frame 54 by a suitable glue or paste and then this sub-frame member, together with the attached foil is inserted into its place upon one of the corrugations or steps of the rectangular frame member 51. Preferably the rectangular member 51 has been provided with a suitable glue or paste so that when the rectangular sub-frame 54, provided with a sheet of bright metallic foil 55, is put into proper position, it will be held in place by such glue or paste. Spaced from the rectangular sub-frame 54, and provided with sheets of bright metallic foil 55, are similar rectangular sub-frames 56 and 57. These sub-frames are similar to the frames 55 but the sub-frame 56 is made smaller in size so as to fit into the innermost corrugation or step which extends around the interior of the rectangular member 51. In this way a dead air space is provided between the sub-frames 55 and 56. The sub-frame 57 is made larger than the sub-frame 54 so that it fits into another corrugation or step which is farther from the food storage compartment than the sub-frame 54 and which also extends around the inner sides of the rectangular frame member 51. This sub-frame 57 is similarly provided with bright metallic foil and is similarly attached to the rectangular frame member 51. In this way a dead air space lined with bright metallic foil is provided between the sub-frames 54 and 57. A still larger sub-frame 58, provided with bright metallic foil, fits within the outermost corrugation or step which extends around the rectangular member 51. In this manner an independent insulation panel is built up.

This panel is preferably constructed in the manner described above before its assembly into the cabinet. In this form, the panel is easily assembled and easily handled. Furthermore, by making the sides of the panels at an angle of 45°, it is possible to provide a mitered joint at the corners of the cabinet. With suitable equipment, the sheets of foil may be glued or pasted directly to the corrugations or steps without the preliminary operation of mounting the sheets of foil upon a rectangular wire frame. The guy wires 42, since they are connected from the inner corners of the outer walls to the edges of the food storage compartment, extend within a plane which forms an angle of 45° to the walls of the cabinet. The insulation panels, having edges of 45° are placed in the cabinet so that their edges abut the guy wires. These guy wires thus pass between the adjacent edges of different panels. With such a construction, proper insulation is provided for the corners of the cabinet and no passages are left which would allow the circulation of air.

For the top wall of the cabinet, a slightly different type of insulation is provided. In this type, a rectangular cardboard frame member 61 is provided which has both its inner and outer sides smooth. Referring more particularly to Fig. 5, the cardboard collar 62 surrounds the insulating collar 36. Sheets of bright metallic foil 63, beginning from a very small size nearest to the food storage compartment and growing progressively larger as they are positioned farther away from the food storage compartment, have their edges 65 and 66 glued or pasted directly to the outer rectangular member 61 and to the sleeves 62. In order to properly support the sleeves 62, heavy cardboard members 67 and 68 connect the rectangular member 61 with sleeves 62. It will be seen that this type of panel insulation is equally applicable to the sides and bottom of the cabinet. By providing proper equipment and machinery, this type of panel construction, as well as the other types described herein, may be easily produced according to mass production methods.

While the form of embodiment of the invention as herein disclosed constitutes a preferred form, it is to be understood that other forms might be adopted, all coming within the scope of the claims which follow.

What is claimed is as follows:

1. An insulated storage compartment including inner and outer walls, said inner walls forming a container, said outer walls being spaced from said inner walls, and means for supporting said inner walls by said outer walls including a plurality of wires connecting said inner and outer walls and insulating means between said inner and outer walls, said insulating means including a plurality of spaced sheets of bright metallic foil having air spaces between the sheets.

2. An insulated storage cabinet including inner and outer walls, said inner walls forming a rectangular container, said outer walls being spaced from said inner walls forming an insulating space therebetween, and wires extending diagonally connecting the corners of said outer cabinet with intermediate points upon the edges of the inner walls for supporting said inner walls by said outer walls.

3. An insulated storage cabinet including inner and outer walls, insulating means between said inner and outer walls including a polygon panel structure, said panel structure having its sides beveled, and a plurality of sheets of bright metallic foil, spaced from each other by air spaces, said sheets of foil being stretched between the sides of the panel structure and having their edges fastened to the inner surface of the sides of the panel structure.

4. An insulated storage cabinet including inner and outer walls, insulating means between said inner and outer walls including a polygon panel structure comprising a polygon frame structure, said frame structure having its sides arranged at an angle to the plane of the panel structure, said sides having a plurality of steps extending around the sides of the frame structure, and sheets of bright metallic foil stretched across said frame structure and having their edges attached to said steps to hold said sheets of foil in spaced relation so as to form air spaces therebetween.

5. An insulated storage cabinet including inner and outer walls, insulating means between said inner and outer walls including a polygon panel structure comprising a polygon frame structure, said frame structure having its sides arranged at an angle to the plane of the panel structure, said sides having a plurality of steps extending around the sides of the frame structure, a plurality of wire sub-frames formed to fit upon said steps, said sub-frames having sheets of bright metallic foil thereon, said sub-frames with their sheets of foil being attached to said steps for holding said sheets of foil in spaced relation to provide air spaces between the sheets.

6. An insulated storage cabinet including inner and outer walls, and insulation between said inner and outer walls including a plurality of polygon frames, said frames having some of their sides adjacent some of the sides of other frames, said frames having their adjacent sides arranged at complementary angles so that the sides will fit together at the corners, a plurality of sheets of bright metallic foil stretched between the sides of said frames, said sheets being spaced from each other providing air spaces therebetween, the edges of said sheets being attached to the inner surfaces of said frames.

7. An insulated storage cabinet including inner and outer walls, and insulation between said inner and outer walls including a plurality of main frames, a plurality of wire sub-frames, sheets of bright metallic foil attached to said wire sub-frames, said sub-frames with the sheets of foil thereon being attached in spaced relation to said main frames to provide air spaces between said sheets of foil.

8. An insulated storage cabinet including inner and outer walls, and insulating means between said walls including a plurality of polygon frames, a plurality of wire sub-frames fitting into said polygon frames, sheets of bright metallic foil upon said wire sub-frames, said sheets of foil and sub-frames being spaced to provide air spaces therebetween, said sub-frames with their sheets of foil being attached to the inner surfaces of said polygon frames.

9. An insulated storage cabinet including inner and outer walls, and insulation between said inner and outer walls including a plurality of polygon frames, said frames having some of their sides adjacent some of the sides of other frames, said frames having their adjacent sides arranged at complementary angles so that the sides will fit together at the corners, a plurality of wire sub-frames formed to fit said polygon frames, said sub-frames having sheets of bright metallic foil attached thereto, said sub-frames with their sheets of foil being attached to said polygon frames in spaced relation for providing air spaces between said sheets of foil.

10. An insulated storage cabinet including inner and outer walls, said inner walls forming a rectangular container, said outer walls being spaced from said inner walls forming an insulating space therebetween, and wires connecting the edges of said inner and outer walls for supporting said inner walls by the outer walls and insulation panels between said inner and outer walls, said panels having their edges at an angle so as to fit together at the intersections of the walls and to have their edges bordering the wires.

11. An insulated storage cabinet including inner and outer walls, said inner walls forming a rectangular container, said outer walls being spaced from said inner walls forming an insulating space therebetween, brackets in the corners of said outer walls, wire holding members fastened to intermediate points upon the edges of said inner walls, and wires stretched diagonally between said holding members and said brackets for supporting said inner walls.

12. An insulated storage cabinet including inner and outer walls, at least one of said walls forming a rectangular container, the inner walls being spaced from the outer walls forming a space therebetween, and wires extending diagonally connecting the corners of the rectangular container with points remote from said corners upon the other walls spaced therefrom for supporting the inner walls by the outer walls, a plurality of said remote points each having a wire extending diagonally to two of said corners of said rectangular container.

13. A rectangular insulating structure including inner and outer walls and insulating means between the inner and outer walls comprising a plurality of rectangular frames having their peripheral sides beveled so as to interfit at the corners of the insulating structure, a plurality of sheets spaced from each other by gas spaces supported by having their edges fastened to the inner sides of the rectangular frames.

14. A structure including inner walls forming an inner polyhedron wall structure, an outer polyhedron structure spaced from and surrounding the inner walls, and wires extending from the corners of one of the polyhedron structures to intermediate points between the corners of the other polyhedron structure for supporting the inner walls from the outer structure, a plurality of said intermediate points each having a wire extending to two of said corners of the other polyhedron structure.

HARRY F. SMITH.